Patented Jan. 4, 1944

2,338,430

UNITED STATES PATENT OFFICE 2,338,430

PROCESS OF PRODUCING NONYELLOWING PHENOL-FORMALDEHYDE CONDENSATES

Bernhard Habraschka, Hamburg, Germany; vested in the Alien Property Custodian

No Drawing. Application May 27, 1940, Serial No. 337,561. In Germany July 13, 1939

1 Claim. (Cl. 260—19)

This invention relates to a process of producing non-yellowing phenol-formaldehyde condensates.

Commercial phenol-formaldehyde condensation products as well as varnishes made therefrom are open to the objection that they turn yellow or brown within a relatively short time.

To diminish this tendency it has been proposed to add metallic oxides or urea-formaldehyde condensates, but such additions while delaying yellowing do not eliminate it. At any rate, fastness to light cannot be attained this way.

It is generally known that phenol cannot be completely converted when condensed with formaldehyde. Finished condensates always contain therefore greater or smaller amounts of free phenol, and it could be ascertained that phenol-formaldehyde condensates turn yellow only in the presence of free phenol. Yellowing always occurred through the action of ultraviolet rays, through oxidation during exposure to air or as a result of heat, and decomposition of the resin molecule was also noted.

It has now been found that yellowing or discoloration of phenol-formaldehyde condensation products, even when subjected to the action of ultraviolet rays, oxygen or heat, can be avoided by converting, in the course of the reaction, the free phenol contained therein into a neutral phenol compound with the aid of an active reagent. In this manner it becomes possible to stabilize phenol condensates and to obtain products that are fast to light.

For example, excellent results could be secured by adding a synthetic fatty acid of the oxidation of paraffin or the esters thereof, the most favorable effects being produced by the $C_{9-18}$ fatty acids or their esters.

The formation of phenolates, combined with fatty acid, of the paraffin group produces also, besides the advantages mentioned, stabilization to such a degree that decomposition of the resin molecule does not occur any more.

The process according to the invention is carried out by dissolving the phenol-formaldehyde condensate, prepared in known manner, in a solvent preferably comprising a mixture of two or more parts of ethyl alcohol, butyl alcohol, propyl alcohol and homologue of benzene. A reagent of the kind mentioned is then added to the dissolved product which is finally hardened in known manner.

The following examples indicate a suitable manner of performing the process according to the invention:

*Example 1*

100 parts phenol-formaldehyde condensate are dissolved in 100 parts of a solvent mixture comprising 75 parts ethyl alcohol, 10 parts butyl alcohol, 10 parts ethyl glycol and 5 parts toluene. To the resin solution 1 to 10 parts, or more if necessary, of a synthetic fatty acid, preferably one of the $C_9C_{18}$ fatty acids, of the paraffin oxidation are added. The mixture is then mixed with .1 to 10% hydrochloric or sulfuric or phosphoric or boric acid or active organic chlorine or sulfo compounds and hardened at room temperature.

The resulting products yield almost transparent solutions and final products of equal clearness.

To increase elasticity known substances, as condensation products of the vinyl group, may be added to the mass.

Products of equal composition and prepared in the same manner except that synthetic fatty acids were omitted or replaced by an addition of 1 to 10 parts of a urea-formaldehyde condensate failed to show fastness to light. A product without a synthetic fatty acid constituent yellows relatively quickly and even turns brown after a few weeks, whilst the addition of a urea-formaldehyde condensate slightly delays yellowing which occurs, however, after several weeks and, in certain instances, leads to browning. Higher additions of urea-formaldehyde condensate amounting for instance to 20% of the phenol-formaldehyde condensate are practically impossible, since due to the catalytic influence of the contact substances rapid hardening occurs already in the solution. The dissolved substances used in the preparation will keep about one hour, but an addition of 20% urea-formaldehyde condensate is not sufficient to prevent or effectively decrease yellowing.

When .01 to 5% of the salts of the zinc or tin and bismuth or vanadium group are added instead of urea-formaldehyde condensates, yellowing is retarded and, if the corresponding chlorine compounds are used, will occur only after weeks or months, though it cannot be avoided in the long run.

Phenol-formaldehyde condensates treated according to the invention do not show, on the other hand, any yellowing or discoloration, even if strongly acted upon by heat, oxygen and ultraviolet rays, and are practically absolutely fast to light.

What is claimed is:

Process of rendering phenol-formaldehyde condensates, which contain free phenol, non-yellowing, said process comprising converting the said free phenol into a neutral phenol compound by reacting the said free phenol in said condensates with a fatty acid having nine to eighteen carbon atoms and which is obtained by paraffin oxidation, said acid being present in the proportion of 1 to 10 parts of acid to 100 parts of condensate.

BERNHARD HABRASCHKA.